Sept. 21, 1943.  R. J. THERIAULT  2,330,182
VEHICLE BODY
Filed Dec. 1, 1939    7 Sheets-Sheet 1
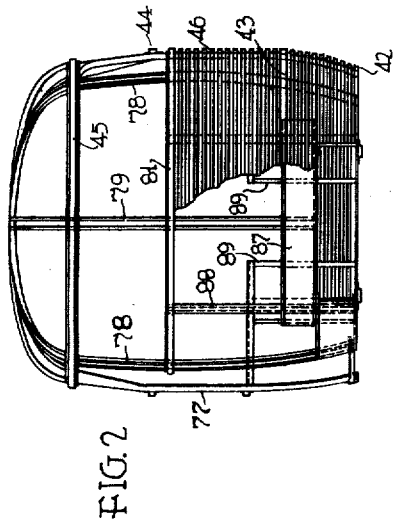
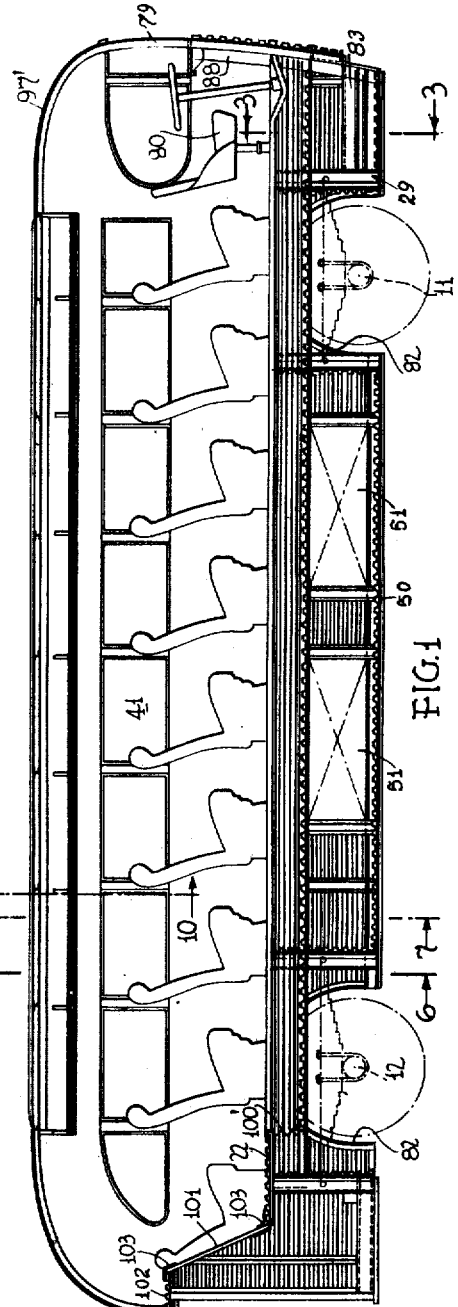
INVENTOR:
Raymond J. Theriault
BY *John P. Tarbox*
ATTORNEY.

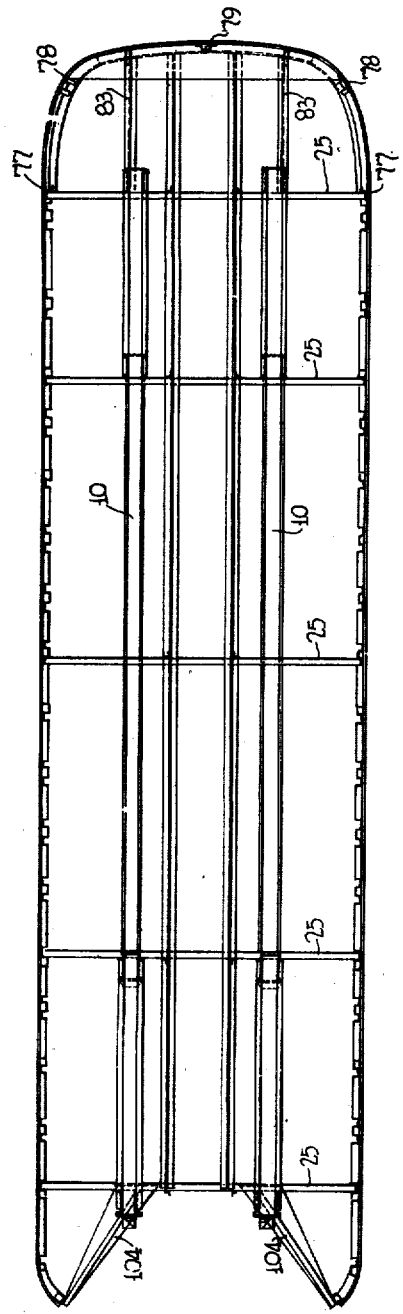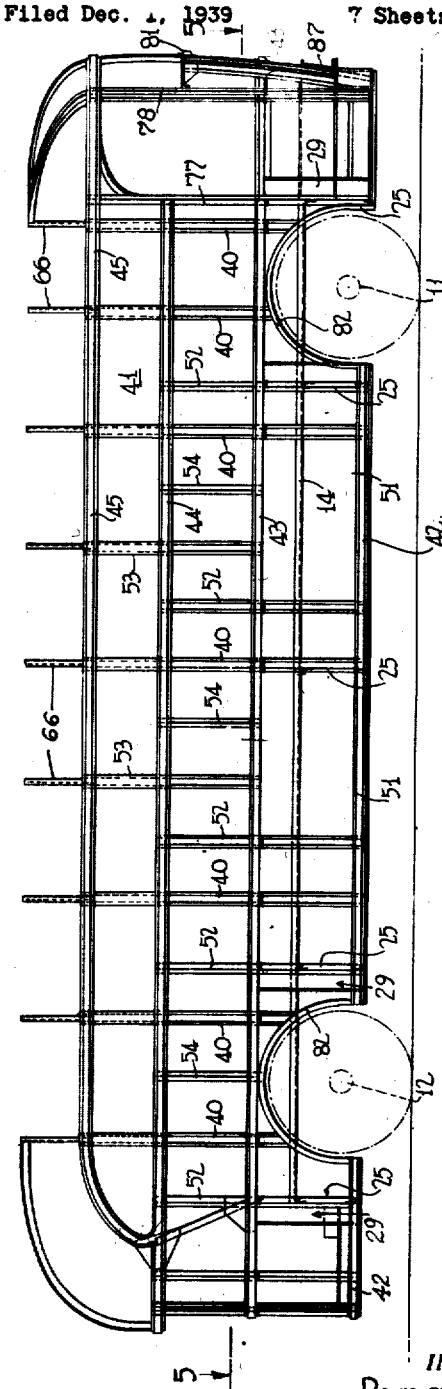

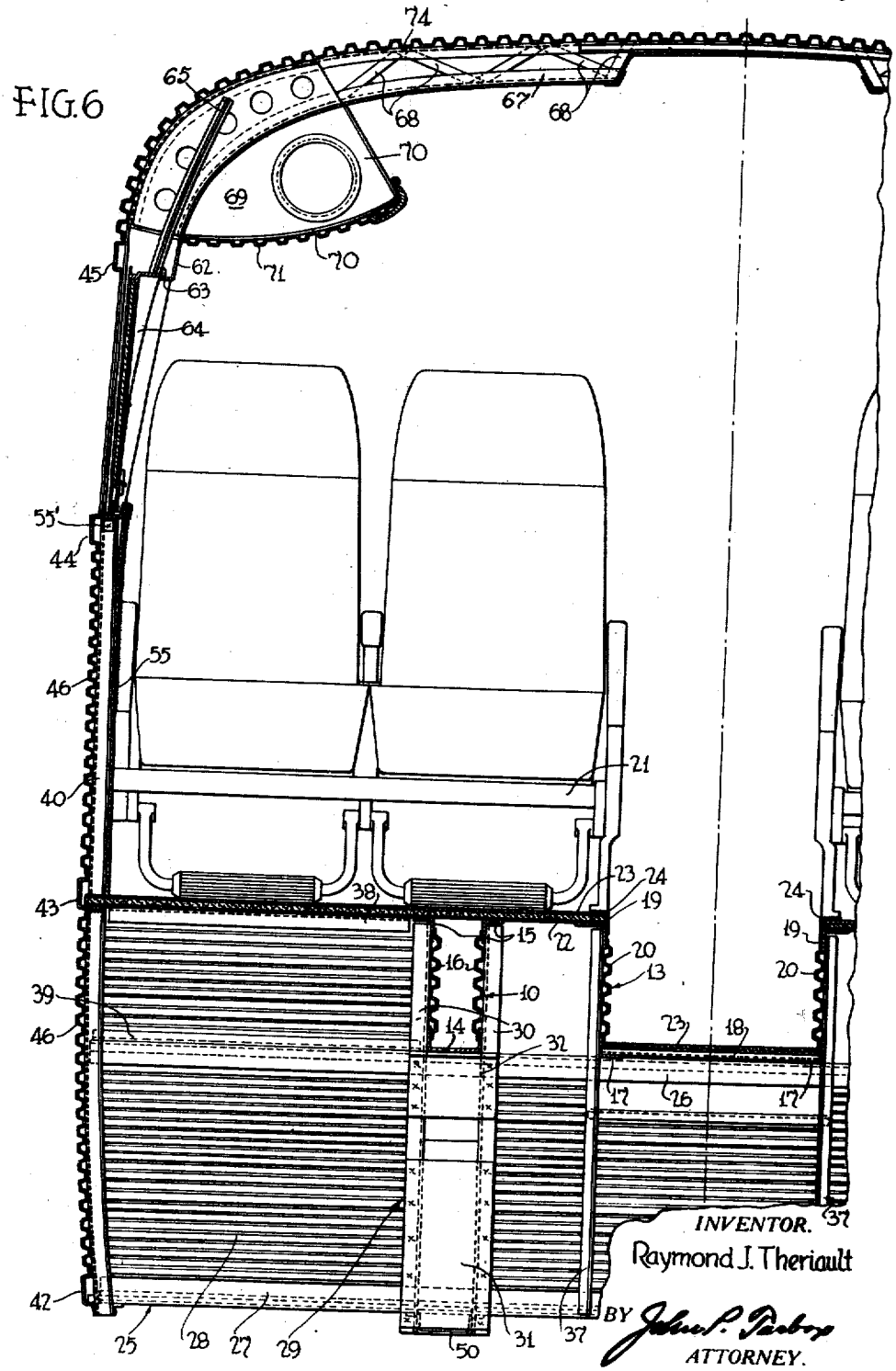

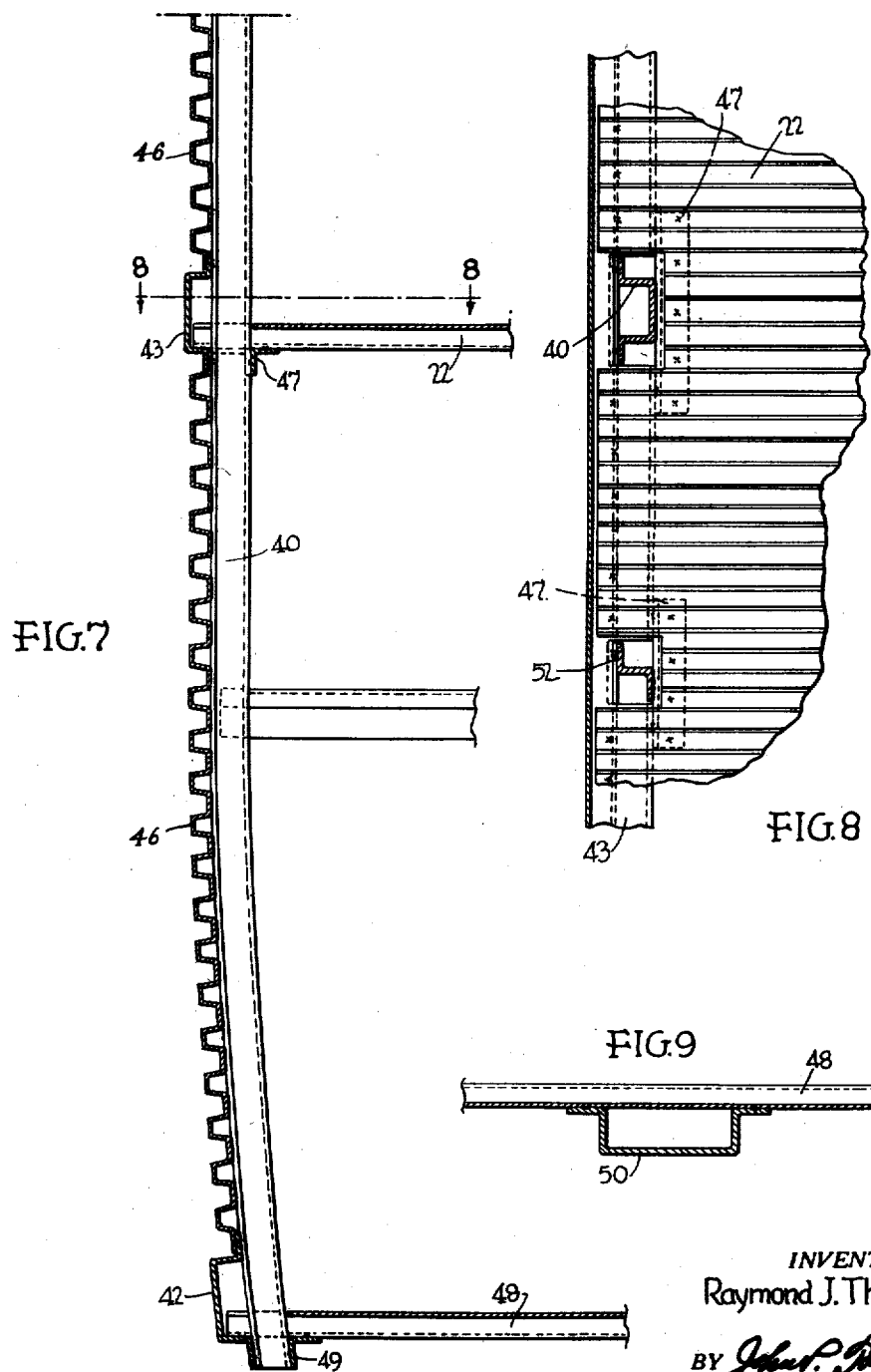

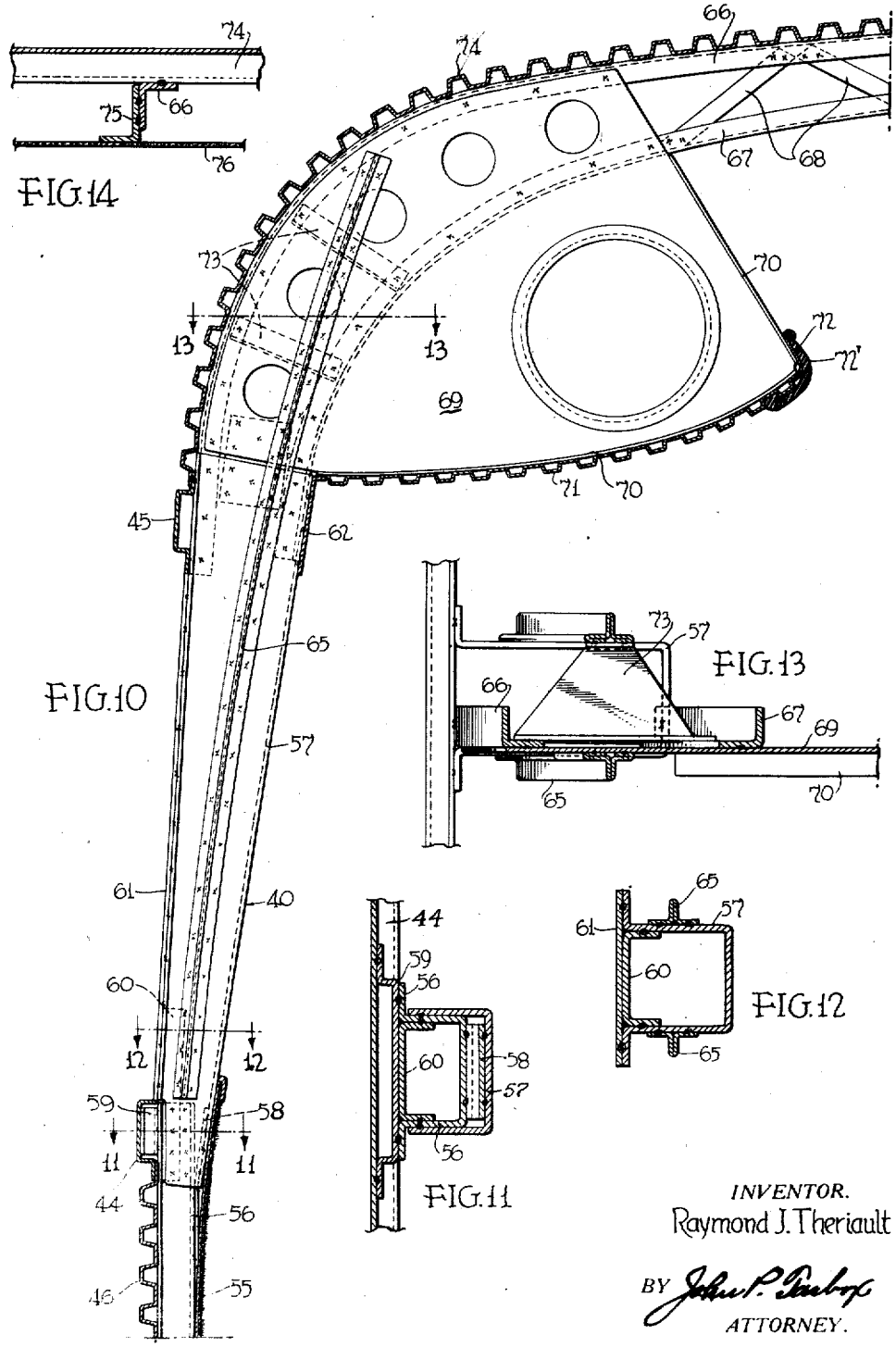

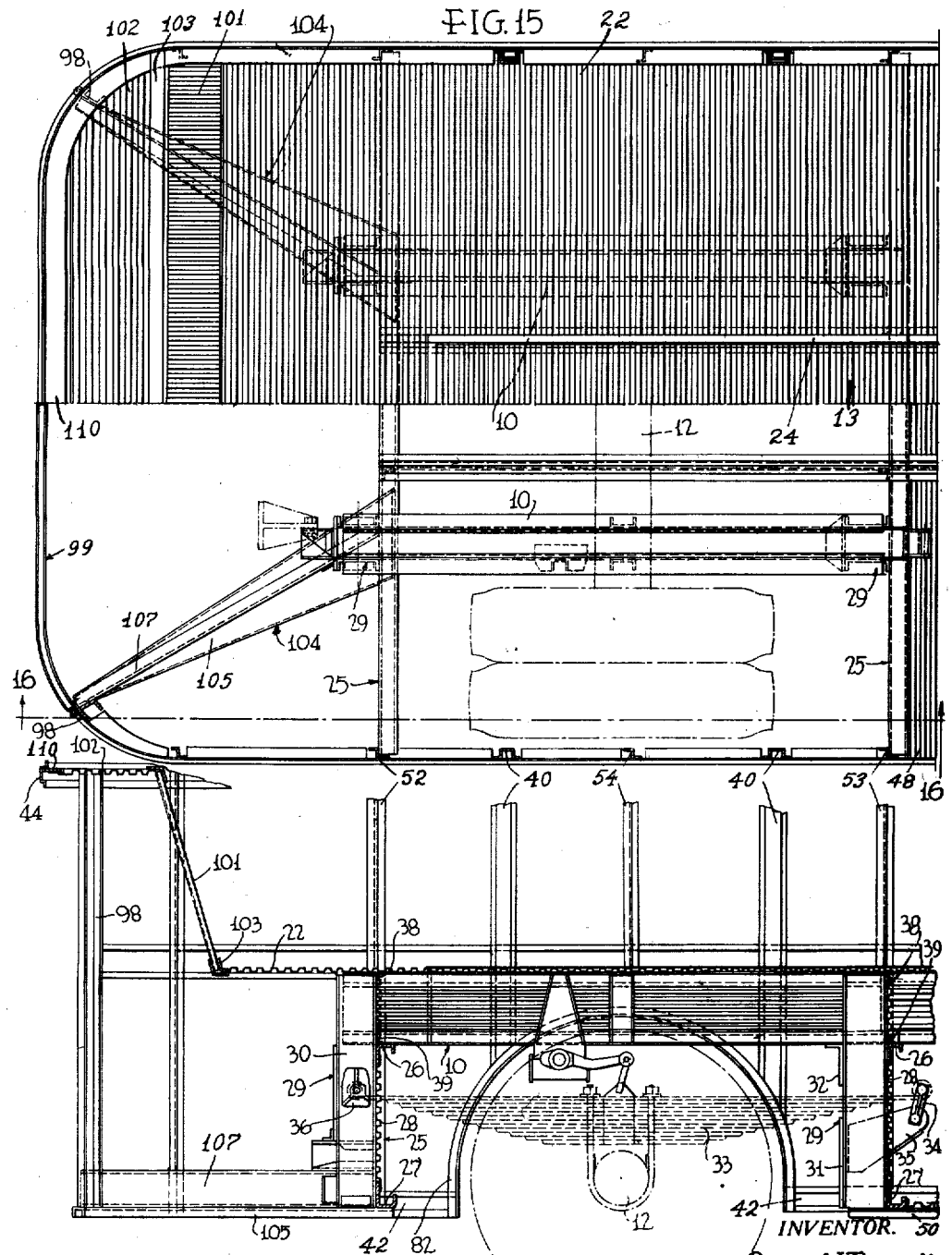

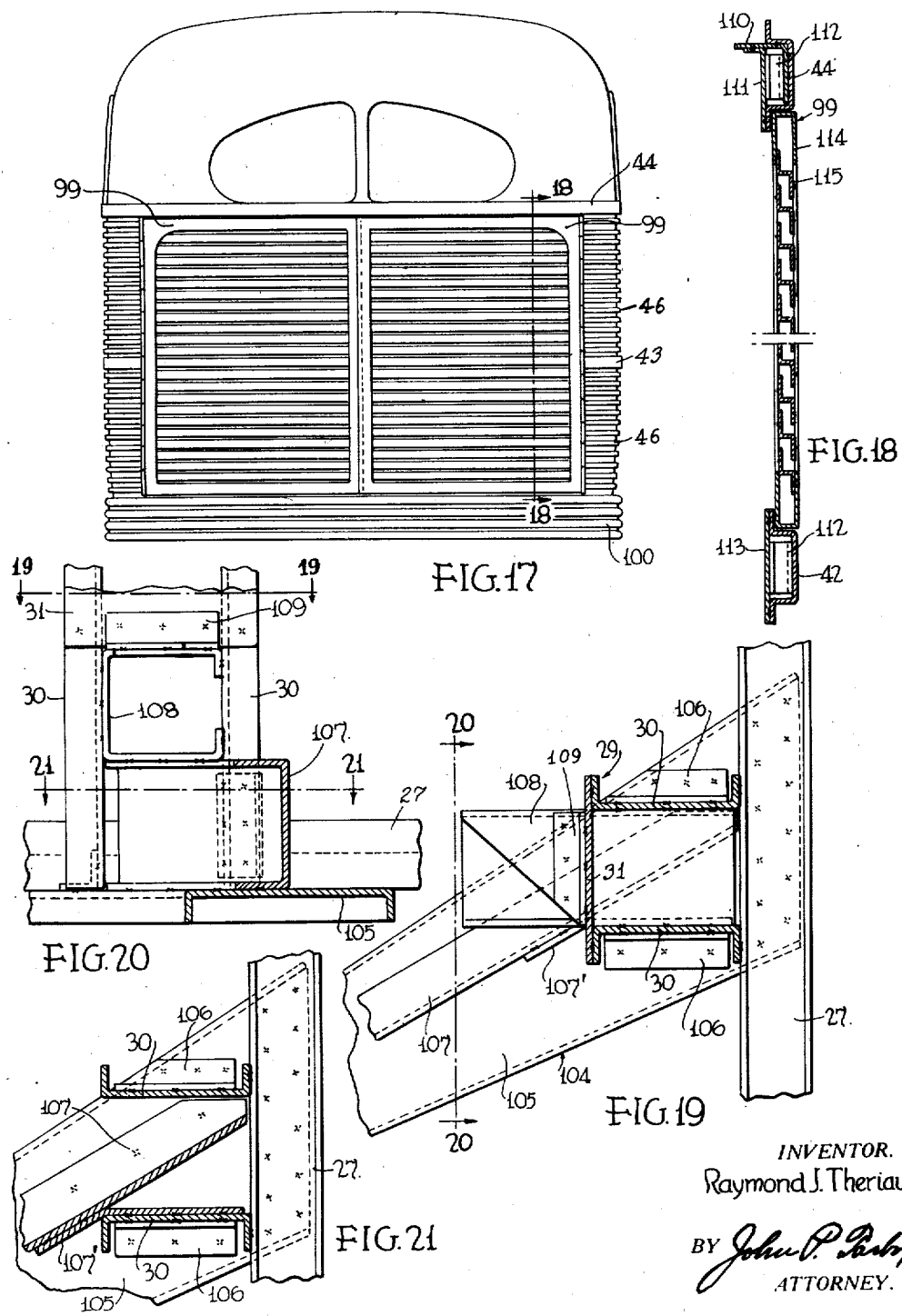

Patented Sept. 21, 1943

2,330,182

UNITED STATES PATENT OFFICE 2,330,182

VEHICLE BODY

Raymond J. Theriault, Philadelphia, Pa., assignor to Edward G. Budd Manufacturing Company, Philadelphia, Pa., a corporation of Pennsylvania Application December 1, 1939, Serial No. 307,011

6 Claims. (Cl. 296—28)

The invention relates to vehicle bodies and more particularly to a vehicle body of the bus type as used for long distance travel. In such vehicles, the body is commonly of a width extending laterally beyond the wheels and the floor of the passenger compartment is for the most part above the wheel housings, the sides of the vehicle being extended down close to the ground and the space below the passengers' compartment being utilized for storage space, for baggage and spare tires, etc., and to provide engine room. Such vehicles are ordinarily provided with a longitudinally central depressed floor portion or aisle. Furthermore, such buses usually carry the engine at the rear end transverse to the body, utilize the space below the floor of the passenger compartment for a luggage storage compartment; and the space at the front end under said floor may serve to receive the spare tire or tires.

It is an object of the invention to provide a vehicle body especially of the aforesaid class, which is light in weight, and has a very roomy interior and in which the walls of the body are all constructed as load-carrying members to take longitudinal and side collision shocks and so that the tubular body cross section formed by the side walls, roof and flooring acts as a tubular beam to carry the vertical loads between the front and rear wheel supports.

To achieve these objects in the highest degree the body is constructed in the main of a framework of angular, channel and/or box-cross section members fabricated out of light-gauge sheet metal of high tensile strength, such as stainless steel of the 18 and 8 variety, and the outer sheathing and flooring is for the most part built of corrugated metal strips with the corrugations so directed as to make the flooring and sheathing load-carrying members in combination with the members of the framework to which they are attached. The parts entering into the structure are so formed as to facilitate their joinder in the assembly by simple spot welding operations.

Other objects are to increase the longitudinal buffing strength of the vehicle body to take care of end collision shocks as well as to carry the loads normally expected. To this end the side walls, roof and underframing and flooring attached thereto, are all strengthened and reinforced and interbraced to make all of them assist in taking such sho[...]rticular, deep box section beams a[...]opposite sides of the depressed center o[...]ring and extend from end to end of the [...]from which the body is spring-supported on the axles adjacent their ends and the longitudinally extending aisle well is fabricated to form a deep wide channel section well adapted to take both vertical and longitudinal collision loads.

Finally, the entire under part of the body below the passenger compartment is transversely reinforced by transverse bulkheads, some forming the front and rear walls of the wheel housings and fabricated to resist lateral shocks and tied to the side walls and to the main longitudinal members of the under body for the mutual strengthening and stabilizing of the members so joined together.

Other and further objects and advantages and the manner in which they are attained will become apparent from the following detailed description when read in connection with the drawings forming a part hereof.

In the drawings:

Fig. 1 is a central vertical longitudinal sectional view of a bus body according to the invention;

Fig. 2 is a front view of the body with parts broken away;

Fig. 3 is a fragmentary transverse sectional view on an enlarged scale, the view being taken substantially along the line 3—3 of Fig. 1;

Fig. 4 is a diagrammatic side elevational view showing the principal framework of the body;

Fig. 5 is a sectional plan view of the framework, the section being taken on the line 5—5 of Fig. 4;

Fig. 6 is a transverse vertical sectional view on an enlarged scale through the vehicle body, the section being extended beyond the center line of the body and being taken substantially along the line 6—6 of Fig. 1;

Fig. 7 is a fragmentary vertical transverse sectional view through the lower portion of the side wall of the body, the section being taken on the line 7—7 of Fig. 1;

Fig. 8 is a fragmentary sectional plan view, the section being taken on the line 8—8 of Fig. 7;

Fig. 9 is a fragmentary transverse vertical sectional view through the bottom wall inwardly of the portion of said wall shown in Fig. 7 and between the front and rear wheel housings;

Fig. 10 is a fragmentary transverse sectional view through the upper part of the side wall and the side of the roof corresponding to the section in Fig. 7 but taken on the section line 10—10 of Fig. 1;

Figs. 11, 12, 13, are fragmentary detail sectional views on an enlarged scale taken, respectively, on the lines 11—11, 12—12, and 13—13 of Fig. 10;

Fig. 14 is a detail longitudinal vertical sectional view through the central portion of the roof;

Fig. 15 is a horizontal sectional plan view, on an enlarged scale, of the rear end of the body, the section of the left half of the body (upper part of the figure) being taken slightly above the lower margin of the window openings of the body and the section of the right half of the body (lower part of the figure) being taken just beneath the center aisle flooring;

Fig. 16 is a fragmentary vertical sectional view, taken on the line 16—16 of Fig. 15 through the lower rear portion of the body;

Fig. 17 is a rear elevational view of the body on a larger scale than Fig. 1;

Fig. 18 is an enlarged fragmentary detail sectional view taken substantially on the line 18—18 of Fig. 17;

Fig. 19 is an enlarged fragmentary detail sectional view, the section being taken along line 19—19 of Fig. 20;

Fig. 20 is a fragmentary detail sectional view taken along the line 20—20 of Fig. 19;

Fig. 21 is a similar view taken along the line 21—21 of Fig. 20.

In the sectional views the sections are taken looking in the direction of the arrows at the ends of the section lines.

The vehicle body according to the invention has its underframe, the side walls and the roof all so constructed and tied together that the ensemble provides in effect, a tubular beam supported adjacent its ends by the front and rear wheels and axles. To achieve maximum lightness of weight, the construction provides that all the walls of the body mentioned assist in carrying the vertical loading.

As shown in Figures 5, 6, 15 and 16, the main longitudinal members of the underframe may comprise the vertically deep box section and rectilinear beams 10 spaced from each other and from the side walls of the body and arranged symmetrically on opposite sides of the vertical central plane of the body. As shown in Figures 4 and 5, these members extend from a location in front of the front wheels and their associated axle 11 rearwardly over the rear wheel axle 12 and terminate at the rear some distance beyond the rear wheels.

An additional longitudinal load-carrying structure of the underframe extending between and beyond the front and rear axles is a wide and deep channel designated generally by the reference numeral 13, this channel being of a depth substantially equal to the depth of the members 10 and having its top in the plane of the tops of these members. The tops of the members 10 and 13 define the general floor plane of the passenger compartment, which plane is well above the wheels so as to permit vertical movement of the wheels and axles with respect to the body without having the wheels contact the flooring.

The main longitudinal members 10 may, for lightness of construction, be built up of a bottom channel chord 14 and top spaced angles 15, the angles 15 being connected with the opposite side walls of the channel by longitudinally corrugated web plates 16.

Similarly the channel 13 may comprise a bottom shallow channel chord formed by spaced angles 17 interconnected by transversely corrugated floor sheeting 18 which forms a depressed aisle flooring running substantially throughout the length of the vehicle body. The channel member 13 has spaced top angles 19, the bottom and top angles 17 and 19 of each side being interconnected by longitudinally corrugated web plates 20.

The main raised portion of the flooring from which the seats 21 are supported comprises transversely corrugated floor sheeting 22 secured to the laterally extending arms of the angles 15 and 19. The sides of the floor sheeting are secured to the side walls in the manner subsequently to be described.

The corrugations of the floor sheeting 18 and 22 are filled with a suitable sound deadening and wear resisting filler 23 such as cork or a cork product or the like. As shown in Figure 6, the edges of this filler are protected at the sides of the channel 13 by angular metal finish members as 24 secured to the angles 19.

The main longitudinal members 10 and 13 and the floor sheeting 22 which interconnects them are further transversely connected to each other and to the side walls of the body by spaced transverse bulkheads indicated generally in Figures 1, 3, 4, 5, 6, 15 and 16 by the reference numeral 25. Two of these bulkheads are arranged adjacent to and fore and aft of each of the front and rear wheels while the fifth one is arranged at an intermediate point. These bulkheads stabilize and strengthen the longitudinal members of the underframe and tie them into the side walls and enable a substantial portion of the vertical loading to be carried by the side walls.

Since these bulkheads are all essentially similar in construction, a description of one of them will suffice. As shown in Figures 6 and 16, each bulkhead may comprise an upper channel 26 and a lower channel 27, these channels extending from side to side of the body for securement to the side walls. The upper channel 26 is secured through its bottom wall to the laterally extending arms of the angles 17 and to the bottom walls of the channels 14. The vertically spaced channels 26 and 27 are interconnected by transversely corrugated sheeting 28 extending from side to side of the body. To further stiffen and strengthen the bulkheads and to provide anchorage for the spring suspension in the bulkheads adjacent the wheels, they are strongly reinforced in direct vertical alignment with the beams 10 by vertical struts designated generally by the reference character 29. These vertical struts may comprise spaced channels 30 overlapping at their tops the opposite sides of the beams 10 and secured thereto and extended down to the bottom of the body. The side walls of the channels adjacent the transversely corrugated sheeting 28 of the bulkhead are secured to this sheeting and to the top and bottom channels 26 and 27 of the bulkhead. The opposite sides of the channels are connected by flat plates 31 and additionally by an angle 32 in the intermediate bulkheads 25, the horizontal arm of this angle being secured to the bottom wall of the channel 14.

As shown in Figure 6 and at the right of Figure 16, the members 31 and 32 are spaced apart and the corrugated sheeting is omitted opposite this space to permit the passage of the spring 33 which supports the body from the axle in this region, the end of this spring being connected by a shackle 34 to a strong bracket 35 strongly secured to the channels 30 and projecting through an opening, not shown, in the bulkhead sheathing 28. The opposite end of this spring is shown connected to brackets 36 which are directly secured to the channels 30, only one of them being visible in Fig. 16.

It will thus be seen that the struts designated generally by the numeral 29 form the means for directly supporting the ends of the longitudinal beams 10 from the wheel and axle suspension. It will be understood that where a shorter spring can be used, both ends of the spring could be directly secured to the struts 29 in the manner shown at the left of Figure 16 and as illustrated diagrammatically in Figure 1 in the case of both front and rear spring suspensions.

Each bulkhead may be further reinforced as shown in Figure 6 by angle members 37 extending from the bottom of the bulkhead to the flooring 22, these angles overlapping the bulkhead members 26, 27 and 28 and being secured thereto and in their upper extended portions overlapping the side walls of the aisle channel 13 and secured thereto. Laterally of the main longitudinal frame members 10, the corrugated bulkhead sheeting 28 may be extended upwardly to the flooring and secured at the top to the flooring 22, through an angle 38 and to the channel 26, at the bottom by another angle 39. Between the central channel 13 and the main beams 10 and below the channel 13 the bulkhead sheeting may be omitted as shown in Fig. 6 to provide longitudinal openings through which ventilating ducts, piping and wiring conduits may extend. As shown in Fig. 15 hereinafter described, the bulkhead members, as 26, 27 and 28 overlap vertical members of the side walls and are secured thereto.

From the foregoing description, it will be seen that the plate-type bulkheads form a very strong transverse reinforcement between the side walls, the flooring and the main longitudinal members of the underframe tying these parts together and stabilizing the longitudinal members against bending or distortion under normal vertical loading or when subjected to collision shocks.

The side walls are constructed as transversely thin vertically deep plate girder structures adapted to carry a substantial part of the vertical load between the points of suspension. These side wall structures each comprise longitudinally spaced posts 40 (see Figure 4) extending from above the window openings 41 below the floor level to the bottom of the side wall of the body, which except at the wheel housings, is located a substantial distance below the floor level and adjacent the roadway. These vertical posts are interconnected at the bottom by a longitudinal member or bottom rail 42, at the floor level by a longitudinal member or floor rail 43, below the window openings by a longitudinal member or belt rail 44 and at the top of the window openings by a longitudinal member or top rail 45. As shown in Figures 4, 6, 7, 8, 10 and 11, the posts 40 may be of outwardly facing flanged channel section and the longitudinal members 42 to 45 inclusive may be inwardly facing flanged channel members secured to the posts through the overlapping flanges of these members and the post flanges. Between the members 42 and 43 and 43 and 44 the longitudinally corrugated sheeting 46 is applied to the posts and secured thereto, the top and bottom margins of this sheeting being secured also to the adjacent marginal flanges of the members 42, 43, 44.

As shown in Figures 6, 7 and 8, the longitudinal member 43 has its lower side wall deepened between the posts and, as shown in Figures 7 and 8 as well as Figure 6, the floor sheeting 22 has its lateral edge extended over this deepened side wall and secured thereto as by spot welds. To further secure the flooring to the longitudinal member 43 in the region of the posts, an angle 47 bridges the posts and is secured thereto and to the downwardly extending edge flange of the bottom wall of the channel 43 in regions beyond the posts through one arm thereof and through the other arm it is secured to the flooring 22. At the posts, as shown in Figure 8, the flooring 22 is cut away to receive them.

At the bottom the side walls of the vehicle are further interconnected by transversely corrugated sub-floor sheeting 48 which overlaps the bottom wall of the channel 42 at the sides, is secured thereto and is further secured to the posts in this region by an inner angle member 49 welded to the bottom of this sheeting and to the inside faces of the posts. The ends of this sub-floor sheeting are secured as shown in Figure 16 to the channels 27 of the bulkheads 25 arranged longitudinally inwardly of the wheels. In line with the vertical struts 29 the corrugated sub-flooring is reinforced from the bulkhead longitudinally inward of the front wheels to the bulkhead just forward of the rear wheels by flanged channel members 50 welded to the sheeting 48 through the flanges thereof (see Figures 6, 9 and 16). This transversely corrugated sub-floor sheeting 48 not only interbraces the side walls at their lower margins but serves as a floor for a baggage compartment or compartments provided between the inwardly located bulkheads adjacent the wheels, the flooring and the side walls. Access may be had to this baggage storage space through door openings 51 normally closed by doors and opening through the lower portions of the side walls.

The side wall plate girder structures are further reinforced and stabilized to carry the vertical loading by vertical posts 52 located between certain of the posts 40 and extending from the bottom of the window openings to the bottom of the body. Other posts as 53 like the posts 40 extend above the window opening but unlike the posts 40 terminate at the floor level. Still further posts as 54 merely extend from the floor rail 43 to the lower window rail 44. As shown in Figures 4, 5, 8, 15 and 16, some of these posts are of flanged channel cross-section while others are of Z cross-section, but in all cases, they provide a flange or flanges which overlap the sheeting and through which they are secured thereto and an inner longitudinally extending face against which the inner trim 55 may be secured.

The side wall plate girders are of course, strongly connected to the bulkheads by having the transverse channels 26, 27, and the corrugated sheeting 28 thereof overlapping posts of the side walls arranged in the transverse planes of the bulkheads and strongly secured together in the overlap, see Figs. 4, 5, 8 and 16. Thus the side walls are stabilized by the bulkheads and vertical loading therein is carried through the bulkheads to the main longitudinal members of the underframes and to the wheels and axles.

The posts 40 and 53 which extend upwardly between the window openings to support and secure the roof structure are of especially reinforced construction in their upper regions as shown in the typical construction illustrated in Figures 10 to 13 inclusive. These posts are comprised of a lower portion 56 of uniform cross-section terminating at the bottom of the window opening and an upper portion 57 which extends some distance below the window opening and is of an increasing depth from below the window opening to its upper end above the window opening. This upper portion 57, like the lower portion 56, may comprise a flanged channel, the flanges of which form outer abutments for a window but in the portion thereof which extends below the window opening these flanges are cut away and the side walls of the channel overlap the side walls of the lower post portion 56 and are welded thereto (see Fig. 11). Additional strength in the joint is secured by a plain strip 58 welded to the bottom wall of the channel 57 and to the bottom wall of the channel 56. The post in this region as shown in Figure 11 is additionally tied to the longitudinal rail 44 by a flanged channel bridging member 59 which has its flanges secured to the bottom of the channel 44 and its bottom wall secured to the flanges of the channel post portion 56. An additional channel member 60 overlapping the side walls of the post portions 56 and 57 and is secured thereto forms a further reinforce for the joint. As shown in Figures 6 and 10, the upper flange of the flanged channel 44 is cut away in the region of the posts but between the posts the upper side wall of the channel is extended inwardly to form the window sill and is flanged upwardly and to this edge flange the inner trim 55 may be secured. Angles, as 55', may secure this inwardly extended upper side wall of the channel 44 to the posts, as 40, see Fig. 6. Between the longitudinal rails 44 and 45 the post portion 57 is closed to box-section form by a flat closing plate 61 welded to the flanges of the channel 57 of the post.

At the top the post portions 57 are connected on their inner side by an angle member 62 extending longitudinally across the posts, this angular member having an inwardly extending flange 63, Fig. 6, between the posts forming abutments for the tops of the windows. The windows 64 are shown as vertically movable windows and they are guided for this movement by curved window guides 65 secured to the opposite side walls of the channels 57 and extended thereabove and secured to the roof structure in a manner to be subsequently described.

As shown in Figures 6 and 10, the posts in the window region are inclined inwardly and above the window openings a transversely arched roof section is secured thereto. This roof section may comprise longitudinally spaced outer angles 66 which overlap one side wall of the upper portions of the channel section posts 57 (see Figures 10 and 13) and are secured thereto, these angles extending from side to side of the body and conforming to the arched form of the roof. Inner arched angle member 67 spaced from the member 66 and secured at its outer end to the bottom and side wall of the top of the channel post 57 terminate short of the central longitudinal plane of the body and form with the members 66 and the diagonal struts 68 interconnecting them vertically deep transverse roof members in the lateral regions of the roof. At the side where the roof curves into the side wall each pair of angles 66 and 67 are further interconnected by a plate 69, this plate being of generally triangular shape and extending inwardly beyond the members 67 to form a bracket. Lightening holes may be provided in this plate as shown in Figures 6 and 10 and the portion thereof projecting beyond the members 67 may be flanged laterally at 70. To the lower flanged margins of these members 69 which are shown curved and inclined inwardly and upwardly is secured the through-running longitudinally corrugated sheet 71 the outer margin of which is secured to the longitudinal member 62 and the inner margin of which is secured to the upwardly extended portion 72 which itself is secured to the inner upwardly extending flange 70 of the plate 69. The parts 69, 71 and 72 form a rack for small parcels which extends, as shown in Figure 1, for substantially the length of the vehicle. A rubber bumper 72' may be secured to inner margin of the rack, see Fig. 10.

The window guide 65 at one side of the post portion 57 is extended above the post and secured in this extended portion to the plate 69. The window guide 65 on the other side of the post 57 is supported in the region above the post by several transverse brackets 73 which are connected to the angles 66 and 67 as shown in Figure 13.

The transverse members 66 of the roof are tied together throughout their length by the longitudinally corrugated roof sheeting 74 extending from the top side rail 45 and secured thereto to the similar top side rail on the opposite side of the body.

The roof and top side wall structure as described forms a very stiff longitudinally extending beam structure at the side edge of the roof which is tied into the deep transverse cantilever beams formed by the reinforced tops of the posts and the transverse vertically deep side portions of the transverse members of the roof, producing an ensemble which is capable of withstanding severe lateral thrusts such as would occur if the vehicle body should be overturned.

The central portion of the roof is made, as shown in Figures 6 and 14, of very shallow vertical depth, the transverse angles 66 in this region each being reinforced by an angle 75, to the horizontally extending arms of which the inner lining 76 may be secured. The sides of this vertical shallow portion merge into the deeper side portions by downwardly and outwardly inclined faces conforming to the inner diagonal struts 68, and these faces may serve for the location of lighting and ventilating members. The deep side portions of the roof are well adapted to house portions of the ventilating duct system and the shallow central portion of the roof provides additional head room in the central aisle section of the vehicle so that even the tallest passengers can walk upright without adding to the overall height of the vehicle.

The side walls may be said to terminate at the front in the vertical posts 77 which are shown as Z-sectioned members (see Figures 2 to 5) secured to the foremost bulkhead 25 and extending from the bottom of the body to the top window rail 45. The post 77 at the right-hand side of the body forms the rear margin of the door opening in this side of the body. This post 77 is arranged very close to the foremost post 40 in the side wall and these two posts together by reason of their strong interconnection by the numerous longitudinal members and the paneling between the longitudinal members form a very strong connection to the roof to transmit compression loading into the roof.

From the post 77 forward the sides merge into the rounded front end of the body, this portion being rounded in plan as well as in elevation to give it a pleasing appearance. The framework of this rounded front end comprises two lateral posts 78 of flanged channel section and a central post 79 of similar section, these posts extending from the bottom of the body up over the roof to the first transverse roof frame member 66 to which they are secured. These post members 78 and 79 are secured together at the top by the top side rail 45 or a continuation thereof extended around the front of the body from side to side as clearly appears in Figures 2 and 4.

The window openings provided in this front between the posts are of greater vertical height than the side window openings so as to give the driver seated on the driver's seat 80, Figure 1, a more extended vision. As a consequence, the lower window rail 81 extending around the front is at a lower level than the lower window rail 44 in the side walls. The floor rail 43 of the side walls may, however, be extended around the front in a manner similar to the top rail 45 except where it is interrupted by openings, such as the doorway opening at the right hand side, and the same is true, to some extent, of the bottom rail 42 which is extended at least partly around the front end from its sides, see Fig. 2.

It might be pointed out here that the bottom rectilinear rails 42 at the sides are continued through the arched wheel housing portions of the side walls by correspondingly arched angular members 82 secured to the outer sheeting in the margins of these wheel housing openings. The corrugated paneling 46 of the side walls is also extended around the front end as clearly appears in Figure 2 and the paneling, rails and posts are strongly secured together in a manner similar to the joinder of these parts in the side walls.

The main longitudinal members 10 of the underframe terminate at the front, as hereinbefore described, at the forward bulkhead 25 and are strongly secured thereto and to the vertical struts 29 forming a part thereof. These members are extended forwardly beyond the bulkhead to the front end of the body by vertically deep laterally facing channels 83 secured to the inner channel 30 of the vertical struts 29. Longitudinally extending flanged channels 84 similar to the channels 50 between the wheel housings are extended to the front end of the body from the forward bulkhead 25 and a transversely corrugated panel 85 extends between channels 83 and their associated flanged channels 84 and is secured thereto. The space between the channels 83 is open at the front through the forward wall, this opening being provided with a door and the space so provided serving to house a spare tire indicated in dotted lines at 86.

The front end is further reinforced above the channels 83 by a transverse member 87 of forwardly facing channel section, this member being secured at the sides to vertical posts 88 extending from the bottom window rail 81 to the bottom rail 42 and at the center to the lower end of the center post 79, see Fig. 2. All these members are strongly secured together in their overlapping regions and to the sheeting and are further secured through vertical posts 89 arranged in the plane of the side walls of the central aisle channel 13 to the left-hand side and bottom of this aisle member which are extended clear to the end of the body.

Thus the central longitudinal member 13 and the side longitudinal members 10 forming the main longitudinal members of the underframe are extended, the latter through the vertical deep laterally facing channels 83 all the way to the front end of the body where they are strongly transversely interconnected by the transverse members 43 and 87 so that the entire ensemble provides a strong collision front through which the collision shocks against the front end are transmitted into the longitudinal members of the underframe.

As shown in Figure 3, the right-hand (left in Fig. 3) wall of the aisle channel 13 is omitted forwardly of the front bulkhead 25 and the flooring 22 also terminates on the same side at this bulkhead to provide in front thereof a step well leading from the central aisle channel 13 to the doorway. The floor of this step well comprises an outer wide step plate 90 supported by an outer sill 91 and the lower side wall of the adjacent channel 83 and secured thereto. The channel 83 forms a riser for the step 92 which is located in elevation half-way between the level of the plate 90 and the bottom of the aisle channel 13. A Z-section member 93 forms the riser between the step 92 and the bottom of the channel 13, this member 93 being supported by an angle 94 from the front bulkhead 25 and at the front by the adjacent vertical post 88. The step 92 may be a corrugated plate supported at one side on the top side wall of the channel 83 and on the other side by the bottom arm of the Z member 93 to both of which members it is secured. Angles 95 may be secured in the angles between the steps and the risers to further secure these parts together. A scuff plate 96 may be applied to the front of the lower riser and a similar angular scuff plate 97 is secured to the upper riser and overlaps by its horizontally extending arm the corrugated flooring 18 and floor covering of the aisle portion.

The compound curved forward portion of the roof in front of the first transverse member 16 may be covered by plain sheeting 97' (see Figure 1) which conforms to the curvature of this portion of the roof.

The side walls are extended rearwardly of the rear bulkhead 26 and each terminate at their slightly in-turned rear portions in a strong vertical post 98 of longitudinally presenting channel section. Between these posts the space below the bottom window rail 44 which is continued around the rounded rear end and the bottom rail 42 is open and normally closed by a pair of doors 99 one hinged to each post 98 and overlapping at their free edges and suitably secured together in a manner not shown. The bottom flanged channel member 42 of the side walls is also extended around the rounded rear end as shown in the section view of Figure 18 and a bumper 100 of rubber or the like is extended around the rear end on the outside of this member. The rail 42 between the posts 98, and the bumper 100 may be removable so as to permit easy installation or removal of the engine. It will be noted that, for the indicated reason, the aforesaid members are omitted in Figures 1, 4, 5 and 16.

As shown in Figures 1 and 16 the central channel 13 terminates short of the rear bulkhead in a vertical transverse panel 100' and from this point to some distance rearwardly of the bulkhead the transverse flooring 22 extends from side to side of the body. From this rear portion of the floor plating 22 extends a rearwardly and upwardly inclined transverse wall 101 which may be of vertically corrugated sheeting, the top of this wall terminating in the plane of the longitudinal member 44 and the space between the top of this wall 101 and the member 44 being bridged by a shelf which may also be made of transversely corrugated plating designated 102. The floor paneling 22 and the corrugated sheeting 101 and 102 may be joined together in their adjacent edges by angles designated generally 103 and welded through their arms respectively to the adjacent edges of the panels.

From the foregoing description, it will be seen that the space below the panels 102, 101 and that portion of the flooring 22 extending rearwardly of the bulkhead is open to provide a housing for the usual transversely located engine unit.

To support this engine unit and to extend the main longitudinal members 10 to the rear end of the body to transmit collision shocks directly to these members, inclined braces 104 are provided extending from the rear bulkhead 25 in the region of its connection to the longitudinal members 10 to the side posts 98. These braces may comprise composite structures which are shown in the present instance to comprise a downwardly facing tapered channel 105 secured through its wide bottom wall to the bottom channel 27 of the bulkhead and to the bottom of the adjacent vertical strut 29 including the channels 30 by means of angles 106 welded respectively to the bottom walls of the channels 30 and to the bottom wall of the channel 105. Each of these braces is secured at its outer end to the bottom wall of the adjacent post 98. This channel 105 is reinforced to strengthen it to support vertical and collison loads by a vertically deep lateral facing channel 107 which is strongly secured through its bottom side wall to the bottom wall of the channel 105 and extends from end to end of the channel 105. The vertical bottom wall of this channel 107 also overlaps at its outer end the bottom wall of the post 98 and is strongly secured thereto and at its inner end it is secured to the adjacent channel 30 by an angular plate 107′. A flanged channel section bracket 108 for supporting the engine is telescoped between the vertical channels 30 of the strut 29, the top wall of the channel 107, and the horizontally extending arm of an angle 109 which is secured through its other arm to the plate 31 inter-connecting the channels 30. The bracket thus forms a wide overlap with the parts with which it telescopes and through this overlap is strongly secured in all its overlapping faces by numerous spot welds.

As shown in Figure 18, the top rail member 44 is reinforced by an angle 110 secured to the bottom of the channel and having an arm extending inwardly. It is through this inwardly extending arm that the panel 102 is secured (see Figure 16). In certain regions as across the door opening this member is additionally reinforced by an angle 111 overlapping the horizontal arm of the angle 110 and the flange of the channel 44 and secured thereto to form a box cross-section. The box cross-section may additionally be strengthened by braces of Z cross-section 112.

Similarly the bottom member 42 is reinforced throughout the bottom of the door opening by an inner plate 113 constituting it a box cross-section member. Similarly this box cross-section may be reinforced by Z members 112.

As shown in Figure 18, the doors themselves may each constitute a peripheral frame 114 of inwardly facing channel cross-section between the vertical side members of which are extended the overlapping but spaced Z-section members 115 secured between the side walls of the channels. This construction permits the ventilating of the engine compartment but by reason of the overlapping of the Zs prevents the entrance of rain into the engine compartment.

In the foregoing detailed description, a specific form in which the invention may be embodied has been described but it will be understood that changes and modifications in the structure may be made by those skilled in the art without departing from the spirit and scope of the invention and such modifications are intended to be covered by the appended claims. The appended claims are outstandingly directed to the combined body underframe and chassis structure whereas other features of the disclosed embodiment form the subject matter of applicant's copending applications "Vehicle body especially for busses," filed February 20, 1943, Serial No. 476,522, and "Vehicle body especially roof structure for busses," filed February 20, 1943, Serial No. 476,523, which are divisions of the present application.

What I claim is:

1. A body construction for vehicles including two transversely spaced main longitudinal frame members disposed beneath the main body of the flooring and secured thereto, side wall portions extending below the main body of the flooring a substantial distance, and a central deep and wide channel section member arranged between and transversely spaced from said frame members and providing a depressed aisle section of the flooring, all said parts extending substantially from end to end of the body, means structurally interconnecting all said parts at certain intervals so that they mutually brace each other against buckling and are consequently adapted for taking end collision shocks far beyond the strength of the single parts.

2. A vehicle floor and underframe construction having a central deep and wide generally U-section aisle portion and longitudinal beams spaced on opposite side therefrom but on the inner side of the location for supporting wheels, said aisle portion and beams running from front to rear wheel suspension, side walls extending below the floor level, said aisle portion, said beams and said side walls being transversely structurally interconnected below the floor by spaced transverse bulkheads of the type forming substantially closed partition walls and being adapted to transmit stresses between the members to which they are connected.

3. A vehicle floor and underframe structure having a longitudinal central deep and wide generally U-section aisle portion extending over a small part of the width of the structure only, and having longitudinal beams spaced on opposite sides from the aisle and from the outer longitudinal margins of the structure; said aisle portion and beams running from the front to the rear wheel suspension, being interconnected by floor panels, one on each side of said aisle, and being additionally transversely interconnected by longitudinally spaced means arranged below the floor so as to mutually brace each other.

4. A vehicle floor and underframe structure having a longitudinal central deep and wide generally U-section aisle portion extending over a small part of the width of the structure only, and having longitudinal beams spaced on opposite sides of the aisle and from the outer longitudinal margins of the structure; said aisle portion and beams running from the front to the rear wheel suspension, floor panels, one on each side of said aisle, interconnecting the latter and said beams, a second panel being horizontally arranged at a distance below said floor panel; said aisle, beams and panels being interconnected by longitudinally spaced strong plate-type bulkheads arranged in vertical transverse position below the floor.

5. In a vehicle body; a longitudinal central structure comprising an aisle U-shaped in cross-section and a pair of beams, one on each side of and close to the aisle; floor panels, one on each side of the aisle, being arranged substantially in the plane of and connected to the upper margins of the aisle and of said beams; said floor panels being arranged above and extending laterally over the location for the road wheels; said central structure extending between and fore and aft the location of a pair of the wheels; load-carrying side walls being connected with and extending fore and aft the wheel location a substantial distance below said floor panels and central aisle; a sub-flooring interconnecting the lower margins of said extended side walls; transverse plate-type bulkheads structurally interconnecting said central structure, floor panels, sub-flooring and extended side walls; one of said bulkheads being arranged immediately fore and another bulkhead immediately aft the wheel location; said sub-flooring extending to one of said last-named bulkheads and the side walls ending between said two bulkheads at a higher level than in the longitudinally adjacent regions so as to present an opening for the lateral insertion or removal of the wheels.

6. In a body according to claim 5, said side walls extending in the region for the wheels to a level below the flooring though to a less extent than in the adjacent regions.

RAYMOND J. THERIAULT.